United States Patent [19]

Bloom et al.

[11] 3,714,325

[45] Jan. 30, 1973

[54] RECOVERY OF MOLYBDENITE

[75] Inventors: Philip A. Bloom, Stuart J. Hussey, both of Salt Lake City, Utah; Lamar Evans, Salt Lake City, Utah

[73] Assignee: The United States of America as represented by the Secretary of the Interior

[22] Filed: Nov. 17, 1970

[21] Appl. No.: 90,096

[52] U.S. Cl. .................. 423/53, 75/2, 75/117, 75/121
[51] Int. Cl. ........ C22b 3/00, B03d 1/00, C22b 15/00
[58] Field of Search........75/1, 2, 101, 113, 117, 121, 75/97, 114

[56] References Cited

UNITED STATES PATENTS

| | | | |
|---|---|---|---|
| 3,117,860 | 1/1964 | Bjerkerud | 75/1 |
| 3,544,309 | 12/1970 | Fletcher | 75/101 R |
| 3,544,306 | 12/1970 | McGauley | 75/101 R |
| 3,455,677 | 7/1969 | Litz | 75/117 |
| 3,196,107 | 7/1965 | Tomic | 75/117 |
| 3,429,693 | 2/1969 | Bauer | 75/101 R |
| 2,746,859 | 5/1956 | McGauley | 75/117 |
| 3,053,614 | 9/1962 | Foos | 75/101 |
| 1,681,528 | 8/1928 | Elliott | 75/117 |
| 2,822,261 | 2/1958 | Mackiw | 75/117 |
| 2,796,344 | 6/1957 | Brennan | 75/121 |
| 3,196,004 | 7/1965 | Kunda | 75/121 |
| 3,458,277 | 7/1969 | Platzke | 75/121 |
| 2,965,447 | 12/1960 | Zimmerley | 75/101 R |

FOREIGN PATENTS OR APPLICATIONS 635,269    1962    Canada .......................75/1

*Primary Examiner*—Winston A. Douglas
*Assistant Examiner*—Peter D. Rosenberg
*Attorney*—Ernest S. Cohen and William S. Brown

[57] ABSTRACT

Low-grade molybdenite flotation products are leached with water at elevated temperature and pressure in an oxidizing atmosphere to selectively dissolve copper, with some sulfur and iron, from sulfide minerals normally present so as to increase the recovery of molybdenite in marketable concentrates.

3 Claims, No Drawings

RECOVERY OF MOLYBDENITE

A considerable portion of the world production of molybdenite is obtained as a by-product from the concentration of copper sulfide from molybdenite-bearing porphyry deposits. Common practice at copper concentrators is to float a bulk copper sulfide-molybdenite concentrate containing approximately 1 percent $MoS_2$. The molybdenite is then separated by flotation in a rougher concentrate which is upgraded by flotation or a combination of flotation and heating to a product usually containing 85 to 90 percent $MoS_2$ and a maximum of 1 percent copper. The small amount of copper left is sometimes then removed chemically with cyanide.

It has now been found, in accordance with the present invention, that the recovery of molybdenite, as a marketable concentrate, from low-grade molybdenite flotation products can be increased by leaching with water, at elevated temperature and pressure in an oxidizing atmosphere, to selectively dissolve copper, with some sulfur and iron, from sulfide minerals normally present. The process of the invention has been found to be effective to raise the grade of low-grade flotation products from starting materials containing about 75 percent $MoS_2$ to finished products containing about 80 to 90 percent $MoS_2$.

Starting materials for the process of the invention are typically molybdenite flotation products containing, in weight percent, about 45 Mo (75 $MoS_2$), about 3 Cu (largely in the form of sulfides), and about 6 Fe (in the form of sulfides).

Leaching is accomplished by maintaining an aqueous slurry of the molybdenite concentrate at a temperature of about 100° to 150° C and an oxygen pressure of about 200 to 600 psi for a period of about 30 to 60 minutes. Concentration of the concentrate in the slurry will usually be from about 5 to 15 weight percent. Any apparatus, e.g., a stainless steel reactor, capable of providing the required temperature and pressure, as well as agitation of the slurry, may be used in the leaching operation.

The leaching is preferably carried out in an atmosphere consisting essentially of oxygen; however, small amounts, e.g., 1 to 15 psi, of air or inert gases may be present without detrimental effects. The oxygen atmosphere is achieved simply by flushing the reaction vessel with oxygen prior to pressurizing.

Following leaching, the aqueous slurry is removed from the reaction vessel and filtered, or otherwise treated, to separate the residue from the leach liquor. The residue is a molybdenite concentrate that will ordinarily contain about 80 to 90 percent $MoS_2$ and only about 0.05 to 1 weight percent of copper. The leached copper, in solution as sulfate, can be recovered in any one of several ways, e.g., by cementation on iron, electrolysis or solvent extraction. The invention will be more specifically illustrated by the following examples.

EXAMPLE 1

A sample of molybdenite concentrate was obtained from a copper concentrator in the Tucson, Ariz. area. A partial analysis revealed it to contain, in percent, 45.2 Mo (75.4 $MoS_2$), 2.84 Cu, 6.1 Fe, and 6.0 insolubles. The major minerals present were molybdenite, chalcocite, chalcopyrite, pyrite, and quartz. The sample, as received from the mill, was filtered, dried, and stored for use as needed.

Equipment used was a high-pressure stainless steel bomb equipped with gauges, fittings, and other parts needed to agitate the slurry and maintain the necessary temperature and pressure.

The test procedure was to place a sample of the bulk concentrate in the pressure bomb together with the appropriate amount of water. The bomb was then sealed and flushed with oxygen. Heat was applied until the slurry was brought to the desired temperature after which oxygen was introduced into the bomb until the necessary pressure was reached. The slurry was then agitated for the required time. Upon completion of the leaching cycle, the content of the bomb was removed and the residue was separated from the leach liquor by filtration.

After subjecting 50 grams of the concentrate in 450 milliliters of water to 245 psi oxygen pressure at a temperature of 150° C for a 30-minute period, a residue was obtained that contained, in percent, 51.7 Mo (86.2 $MoS_2$), 0.06 Cu, and 3.07 Fe, and accounted for a recovery of, in percent, 95.3 Mo, 1.4 Cu, and 39.1 Fe.

EXAMPLE 2

Starting with the concentrate of Example 1 and using the same procedure but varying the conditions by reducing the temperature to 130° C, increasing the oxygen pressure to 490 psi and increasing the leach time to 60 minutes, a leach residue was obtained that contained, in percent, 51.6 Mo (86.1 $MoS_2$), 0.25 Cu, and 3.3 Fe with recoveries of, in percent, 97.5 Mo, 6.9 Cu, and 45.0 Fe.

EXAMPLE 3

Starting with the concentrate of Example 1 and using the same procedure but varying the conditions to 650 psi oxygen pressure, a temperature of 100° C and a leach time of 60 minutes, a leach residue was obtained that contained, in percent, 47.9 Mo (79.9 $MoS_2$), 0.60 Cu, and 6.0 Fe with recoveries of, in percent, 99.8 Mo, 19.0 Cu, and 90.6 Fe.

The results of the three examples are summarized in table 1.

TABLE 1.—SUMMARY OF RESULTS OF THE EXAMPLES

| Example number [1] | Leach conditions | | | Residue | | | | | |
|---|---|---|---|---|---|---|---|---|---|
| | Temperature, ° C. | Oxygen pressure, p.s.i. | Time, minutes | Analysis, pct. | | | Recovery, pct. | | |
| | | | | $MoS_2$ | Cu | Fe | $MoS_2$ | Cu | Fe |
| 1 | 150 | 245 | 30 | 86.2 | 0.06 | 3.1 | 95.3 | 1.4 | 39.1 |
| 2 | 130 | 490 | 60 | 86.1 | .25 | 3.3 | 97.5 | 6.9 | 45.0 |
| 3 | 100 | 650 | 60 | 79.9 | .60 | 6.0 | 99.8 | 19.0 | 90.6 |

[1] Original head analyses, in percent, 75.4 $MoS_2$, 2.84 Cu, 6.1 Fe.

Laboratory tests show that about 150° C is a critical maximum temperature because molybdenite is leached with extreme rapidity above this temperature. Starting with the same concentrate as in previous examples and using the same procedure with a temperature of 200° C, an oxygen pressure of 390 psi, and a leach time of 30 minutes, only 82 percent of the molybdenum was recovered in the residue.

The effect of increasing reaction time was shown by tests made, as previously described, upon the same concentrate. The leach conditions and results were as shown in table 2.

TABLE 2.—REACTION TIME DATA [1]

| Reaction time, hours | Leached concentrate | | | | | |
|---|---|---|---|---|---|---|
| | Analysis, percent | | | Recovery, percent | | |
| | Mo | Cu | Fe | Mo | Cu | Fe |
| 0.5 | 51.7 | 0.06 | 3.07 | 95.3 | 1.4 | 39.1 |
| 1 | 51.0 | .10 | 2.72 | 81.7 | 2.7 | 30.5 |
| 2 | 51.1 | .09 | 1.24 | 60.2 | 1.4 | 10.4 |

[1] Tests made at 150° C. and 245 p.s.i. oxygen pressure.

The results in table 2 show that by increasing the reaction time, an undesirably large quantity of molybdenum was dissolved.

In the process of the invention, therefore, leach time is an important factor because a long leach time (more than 2 hours) results in undesirable dissolution of molybdenite. In addition, long leach times require more expensive equipment. To achieve a suitably short leach time, the maximum extraction of copper, iron and sulfur, and the minimum dissolution of molybdenite, the leach conditions must comprise temperatures from about 100° to 150° C and oxygen pressures from about 200 to 600 psi.

What is claimed is:

1. A method for increasing the recovery of molybdenite from low-grade molybdenite flotation products comprising water leaching of the low-grade products in an oxygen atmosphere at temperatures of about 100 to 150° C and pressure of about 200 to 600 psi to selectively dissolve copper in preference to molybdenum.

2. The method of claim 1, in which the low-grade molybdenite flotation product contains about 75 percent of $MoS_2$ and about 3 percent of Cu.

3. The method of claim 1 in which the leach time is about 30 minutes to 60 minutes.

* * * * *